(12) United States Patent
Bryson et al.

(10) Patent No.: US 7,068,598 B1
(45) Date of Patent: Jun. 27, 2006

(54) IP PACKET ACCESS GATEWAY

(75) Inventors: Sidney Llewellyn Bryson, Bolingbrook, IL (US); Ronald Harding Davis, Naperville, IL (US); Robert Brian Dianda, Naperville, IL (US); Scott Douglas Olmstead, Wheaton, IL (US); Monica Sentoff, West Chicago, IL (US); Shang-Fon Su, Naperville, IL (US); Margaret Hueying Yang, Naperville, IL (US); Hsien-Chuen Yu, Naperville, IL (US); Edward Alan Clark, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 863 days.

(21) Appl. No.: 09/784,497

(22) Filed: Feb. 15, 2001

(51) Int. Cl.
*H04L 12/66* (2006.01)

(52) U.S. Cl. ............... 370/230; 370/236; 370/352; 370/395.52; 370/401

(58) Field of Classification Search ........ 370/352–356, 370/392, 395.52, 401, 230, 231, 235, 236, 370/389, 395.1, 395.2, 395; 709/230, 232, 709/238, 249
See application file for complete search history.

(56) References Cited

U.S. PATENT DOCUMENTS

| | | | |
|---|---|---|---|
| 6,363,065 B1* | 3/2002 | Thornton et al. | 370/352 |
| 6,724,747 B1* | 4/2004 | Arango et al. | 370/352 |
| 6,741,585 B1* | 5/2004 | Munoz et al. | 370/352 |
| 2002/0110112 A1* | 8/2002 | Tuomi | 370/352 |

* cited by examiner

*Primary Examiner*—Alpus H. Hsu
*Assistant Examiner*—Lee Khuong

(57) ABSTRACT

An IP Packet Access Gateway (IP PAG) system manages an IP bearer path between communicating IP endpoints. The system includes an IP PAG having a first IP bearer connection termination for terminating a first bearer connection with a first IP endpoint, and a second IP connection termination or terminating a second bearer connection with a second IP endpoint. A call control entity is associated with the IP PAG and communicates call control instructions thereto. The call control instructions include instructions for logically concatenating the connections into an active IP bearer path extending between the first IP endpoint and the second IP endpoint. A bearer traffic IP packet handler in the IP PAG moves bearer traffic IP packet payloads over the active IP bearer path.

60 Claims, 7 Drawing Sheets

FIG. 2

| BEARER CONNECTION ADDRESS TABLE ||| |
|---|---|---|
| FIRST CONNECTION IP TUPLE  30 | SECOND CONNECTION IP TUPLE  32 | ACTIVE/INACTIVE STATUS FLAG  40 |
| IP TUPLE ENDPOINT_1  36 | IP TUPLE ENDPOINT_2  38 | ACTIVE  42 |
| ⋮ | | |
| IP TUPLE ENDPOINT_X | IP TUPLE ENDPOINT_Y | INACTIVE |

FIG. 4

| AUTHORIZED IP ENDPOINT ADDRESS TABLE | |
|---|---|
| AUTHORIZED ENDPOINT IP ADDRESS  52 | ASSIGNED PORT NUMBER  54 |
| IP ADDRESS ENDPOINT 1 | PORT NUMBER 1 |
| ⋮ | |
| IP ADDRESS ENDPOINT N | PORT NUMBER N |

IP PACKET ACCESS GATEWAY

RELATED APPLICATIONS

The present application is related to commonly assigned copending application Ser. No. 09/784,498, entitled IP Packet Access Gateway, filed on even date with the present application.

BACKGROUND OF THE INVENTION

1. Field of the Invention

This invention relates to telecommunication networks. More particularly, the invention concerns the control of voice calls in an IP network.

2. Description of the Prior Art

By way of background, IP (Internet Protocol) packet networks are now being used to provide bearer pathways for voice communications. In these systems, voice calls between communicating IP endpoints, such as IP telephones, are placed on through-connections established by network switching nodes. Such connections are router-based and are generally under the control of the endpoints themselves.

What is lacking in conventional VoIP (Voice over IP) systems is an interface for implementing bearer path connection control and manipulation at packet network points of entry. In particular, there is no mechanism for positive enforcement of bearer connection establishment and teardown. Connections cannot be terminated except by one or both of the IP endpoints. This means that parties using IP telephones might continue to talk even though billing for a call has stopped (i.e., because bearer path remains open). Conversely, billing might continue after the parties have ended the call.

Conventional VoIP systems also lack ability to provide pivot points for VoIP lines and trunks carrying the IP bearer traffic into and out of an IP core network. Such pivot points are currently only provided by LAGs (Line Access Gateways) and TAGs (Trunk Access Gateways) that carry purely TDM bearer traffic or which interwork between TDM bearer traffic and packet orientated (e.g., ATM, IP) bearer traffic. Without pivot points on the trunk side of an IP network entry point, packet switches need to be aware of when another switch in a call manipulates the bearer path. The bearer path thereby becomes a shared resource that all switches will jointly use to provide their own services. This greatly increases the complexity of implementing services because feature interactions cross switch boundaries. Without pivot points on the line side of an IP network entry point, packet switches cannot perform call redirection and insert/remove service circuits in established connections to provide the usual services available to TDM (Time Division Multiplexing) lines. Such services include N-way bridging, announcement playback, tone generation, tone detection, speech recognition, and multicasting.

In addition to the forgoing disadvantages of conventional VoIP systems, certain law enforcement statutes, such as the Communications Assistance for Law Enforcement Act (CALEA) (47 U.S.C. 1001 et seq.), require that a call involving a surveillance subject remain under surveillance even after the subject is no longer a participated in the call. Because count orders for CALEA surveillance may limit the geographic scope over which the surveillance may be performed, there is a need to ensure that the bearer path for a call stays within the geographic bounds within which it may be surveilled. If IP endpoints are able to establish a bearer path using conventional routing, there is no such guarantee.

Accordingly, there is a need in a packet network providing voice connection service for an interface system that implements bearer path connection control and manipulation at packet network points of entry. The same capability is also needed when data and voice calls are transported over IP.

SUMMARY OF THE INVENTION

The foregoing problems are solved and an advance in the art is obtained by an IP Packet Access Gateway (IP PAG) system for managing an IP bearer path between communicating IP endpoints. The system includes an IP PAG having a first IP bearer connection termination for terminating a first bearer connection with a first IP endpoint, and a second IP connection termination for terminating a second bearer connection with a second IP endpoint. A call control entity is associated with the IP PAG and communicates call control instructions thereto. The call control instructions include instructions for logically concatenating the connections into an active IP bearer path extending between the first IP endpoint and the second IP endpoint. A bearer traffic IP packet handler in the IP PAG moves bearer traffic IP packet payloads over the active IP bearer path.

In preferred embodiments of the invention, the IP PAG includes a bearer connection address table that associates the active IP bearer path with the first bearer connection and the second bearer connection in accordance with the above-mentioned concatenating instructions. The connection address table includes a key entry corresponding to the active IP bearer path (IP bearer path entry). This key entry comprises first and second tuples respectively corresponding to the first bearer connection and the second bearer connection. The first tuple includes an IP address and port number for the IP PAG and an IP address port number for the first IP endpoint. The second tuple includes an IP address and port number for the IP PAG and an IP address and port number for the second IP endpoint.

As stated, the bearer traffic IP packet handler is adapted to move bearer traffic IP packet payloads from a source IP endpoint to a destination IP endpoint. In the preferred embodiments of the invention, it does this by (1) receiving a bearer traffic IP packet from the source IP endpoint over a source bearer connection, (2) searching for an IP bearer path entry in the connection address table having an associated first tuple that contains the packet header source IP address and source port number of the received IP packet, (3) upon locating the IP bearer path entry in the connection address table, determining from the second tuple associated with the entry the IP address and port number of the destination IP endpoint, (4) rewriting the packet header of the bearer traffic IP packet using the IP address and port number of the IP PAG as the source IP address and source port number, and using the IP address and port number of the destination IP endpoint as the destination IP address and destination port number, and (5) sending the rewritten bearer traffic IP packet to the destination IP endpoint over a destination bearer connection.

The bearer traffic IP packet handler may also be adapted to perform bearer traffic policing to verify that the received bearer traffic IP packet is authorized for transmission on that path and is associated with an active IP bearer path. To that end, each IP bearer path entry in the address connection table preferably includes a status flag that is indicative of an associated IP bearer path being active or inactive. The bearer traffic policing function will then include checking whether the packet is received from a connection presented in the bearer connection address table and whether the connection is active. Unauthorized packets and packets sent over an authorized but inactive IP bearer path can be logged and/or dropped. In addition, bearer traffic policing could include enforcement of the amount of IP bearer traffic the source is allowed to send for a given IP bearer path.

The IP PAG can be controlled by the call control entity to act as an IP bearer path pivot point, so that, by way of example, service circuits can be switched in and out of a call. To implement such a pivot point, the call control entity modifies the connection address table to add an IP bearer path for each required connection. This will typically result in multiple table entries comprising tuples that correspond a common IP endpoint. Pivoting is then performed by selectively activating the status flags associated with each IP bearer path entry.

The IP PAG system of the invention may further include a signaling traffic IP packet handler for relaying signaling messages from an IP endpoint to a destination. The signaling traffic IP packet handler maintains an IP endpoint address table that lists IP addresses for IP endpoints that are authorized to send signaling messages to the destination. The table also lists port numbers, one for each authorized IP endpoint, to be used by the IP PAG as the source port number when the signaling traffic IP packet handler relays the signaling message to the call control entity or an SNMP manager. The call control entity or SNMP manager can then use the source port number in the received signaling packet to identify the original sender (IP endpoint) of the signaling messages. Signaling message relay can include receiving a signaling traffic IP packet from an IP endpoint and rewriting the packet header by (1) setting the source IP address to the IP address of the relaying IP PAG, (2) setting the source port number to the port number assigned to the IP endpoint originating the signaling message (as found in the IP endpoint address table), (3) setting the destination IP address to the IP address of the destination (as determined by the destination port number and source IP address of the signaling message received), and (4) leaving the destination port unchanged. The signaling message could be an H.323, SIP, H.248, or other signaling message intended for a call control entity, an SNMP signaling message intended for an SNMP manager, or otherwise.

The signaling traffic IP packet handler may also be adapted to perform signaling traffic policing to verify that the IP endpoint sending a signaling message is authorized to send the message. The signaling traffic policing function can include performing a table lookup in the IP endpoint address table relative to an IP signaling packet received from an IP endpoint to verify that the IP endpoint is listed in said table, and to find the IP PAG port number assigned to the IP endpoint stored in said table. As an additional feature, the IP PAG can be adapted to dynamically throttle signaling messages sent to the call control entity.

In an embodiment of the invention that can be used in association with a network switching node, the IP PAG system includes a line-side IP PAG terminating plural IP lines and a trunk-side IP PAG terminating plural IP trunks. An IP switching fabric interconnects the line-side IP PAG and the trunk-side IP PAG. The system may further include one or more resource servers, interworking gateways, interworking units, or data termination systems.

BRIEF DESCRIPTION OF THE DRAWING

The foregoing and other features and advantages of the invention will be apparent from the following more particular description of preferred embodiments of the invention, as illustrated in the accompanying Drawing, in which:

FIG. 2 is a diagrammatic illustration of a bearer connection address table generated in accordance with the invention;

FIG. 4 is a diagrammatic illustration of an IP endpoint address table;

DETAILED DESCRIPTION OF THE PREFERRED EMBODIMENT

Figure 1:
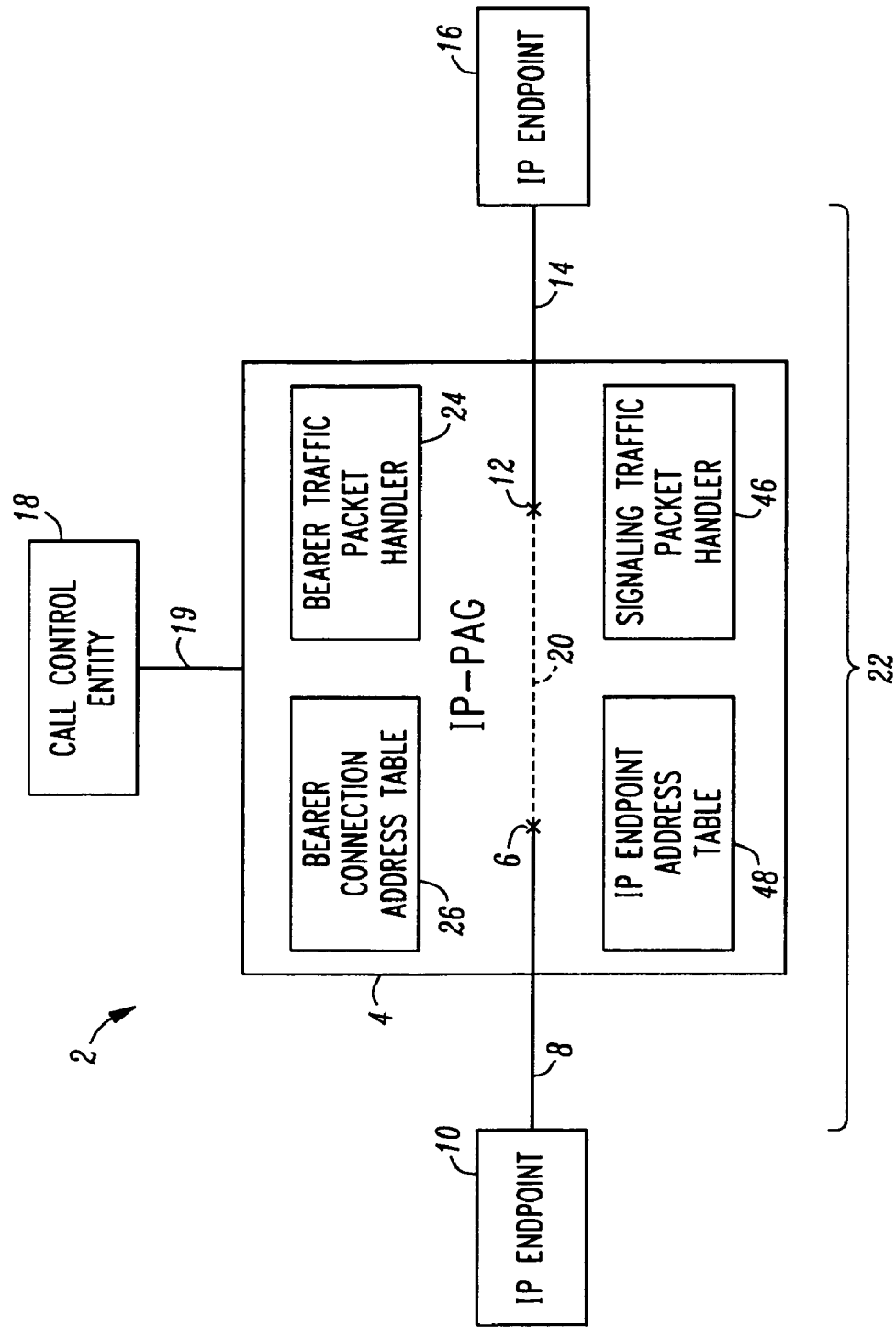
FIG. 1 is a block diagram showing an IP Packet Access Gateway (IP PAG) system constructed in accordance with the invention.

Turning now to the Drawing, wherein like reference numbers indicate like elements in all of the several views, FIG. 1 illustrates an IP PAG system 2 for managing an IP bearer path between communicating IP endpoints. The system 2 includes an IP PAG 4 having a first IP bearer connection termination 6 for terminating a first bearer connection 8 with a first IP endpoint 10. The IP PAG 4 further includes a second IP connection termination 12 for terminating a second bearer connection 14 with a second IP endpoint 16. A call control entity 18 is associated with the IP PAG 4 and communicates call control instructions thereto. The call control instructions include instructions for logically concatenating the first and second bearer connections 8 and 14 (as shown at 20) into an active IP bearer path 22 extending between the first IP endpoint 10 and the second IP endpoint 16. A bearer traffic IP packet handler 24 (bearer traffic packet handler) in the IP PAG 4 moves bearer traffic IP packet payloads over the active IP bearer path 22. In the ensuing discussion, it will be assumed that the IP endpoints 10 and 16 are adapted for VoIP calls. As such, the active IP bearer path 22 will be hereinafter referred to as an active VoIP bearer path.

In preferred embodiments of the invention, the IP PAG 4 indicates a bearer connection address table 26 that is created and dynamically managed by the call control entity 18 in accordance with the above-mentioned concatenating instructions. This table associates the active VoIP bearer path 22 with the first bearer connection 8 and the second bearer connection 14. As shown in FIG. 2, the bearer connection address table 26 will typically include an array of key entries 28 that correspond to various VoIP bearer paths (VoIP bearer path entities) being handled by the IP PAG 4 under instructions from the call control entity 18. Each VoIP bearer path entry 28 contains transport addresses 30 and 32 for the two bearer connections associated with the represented VoIP bearer path. These transport addresses can be represented as IP tuples that each contain the IP addresses and port numbers associated with a bearer connection between an IP endpoint and the IP PAG 4. In particular, each tuple will include an IP address and port number used by the IP endpoint relative to the bearer connection and an IP address and port number used by the IP PAG relative to the bearer connection.

By way of example, the bearer connection address table 26 includes a VoIP bearer path entry 34 that represents the active VoIP bearer path. Associated with the entry 34 is a first tuple 36 corresponding to the first bearer connection 8 and a second tuple 38 corresponding to the second bearer connection 14. The first tuple 36 includes an IP address/port number pair for the first IP endpoint 10, and an IP address/port number pair for the IP PAG 4. The second tuple 38 includes an IP address/port number pair for the second endpoint 16, and an IP address/port number pair for the IP PAG 4. The bearer traffic packet handler 24 moves bearer traffic IP packet payloads between the first IP endpoint 10 and the second IP endpoint 16 by looking for the entry 34 in the bearer connection address table 26. For example, when the bearer traffic packet handler 24 receives a bearer traffic IP packet from the first IP endpoint 10 over the first bearer connection 8, it uses the packet header information to search for the first tuple 36. Insofar as the first tuple 36 contains the IP address/port number used by the first IP endpoint 10 relative to the first bearer connection 8, and an IP address/port number used by the IP PAG 4 relative to the first bearer connection 8, this information will match the source and destination address information in the incoming packet header.

If the first IP endpoint 10 is involved in a conference call, or has received a tone or announcement, or has otherwise communicated with an entity other than the second IP endpoint 16, the bearer connection address table 26 may contain multiple VoIP bearer path entries 34 having an associated tuple 36 identifying the first IP endpoint. In that case, the IP PAG 4 can be controlled by the call control entity 18 to act as a VoIP bearer path pivot point by selectively activating status flags 40 associated with the VoIP bearer path entries. One such status flag, referenced at 42 in FIG. 2, is associated with the VoIP bearer path entry 34.

Figure 3:
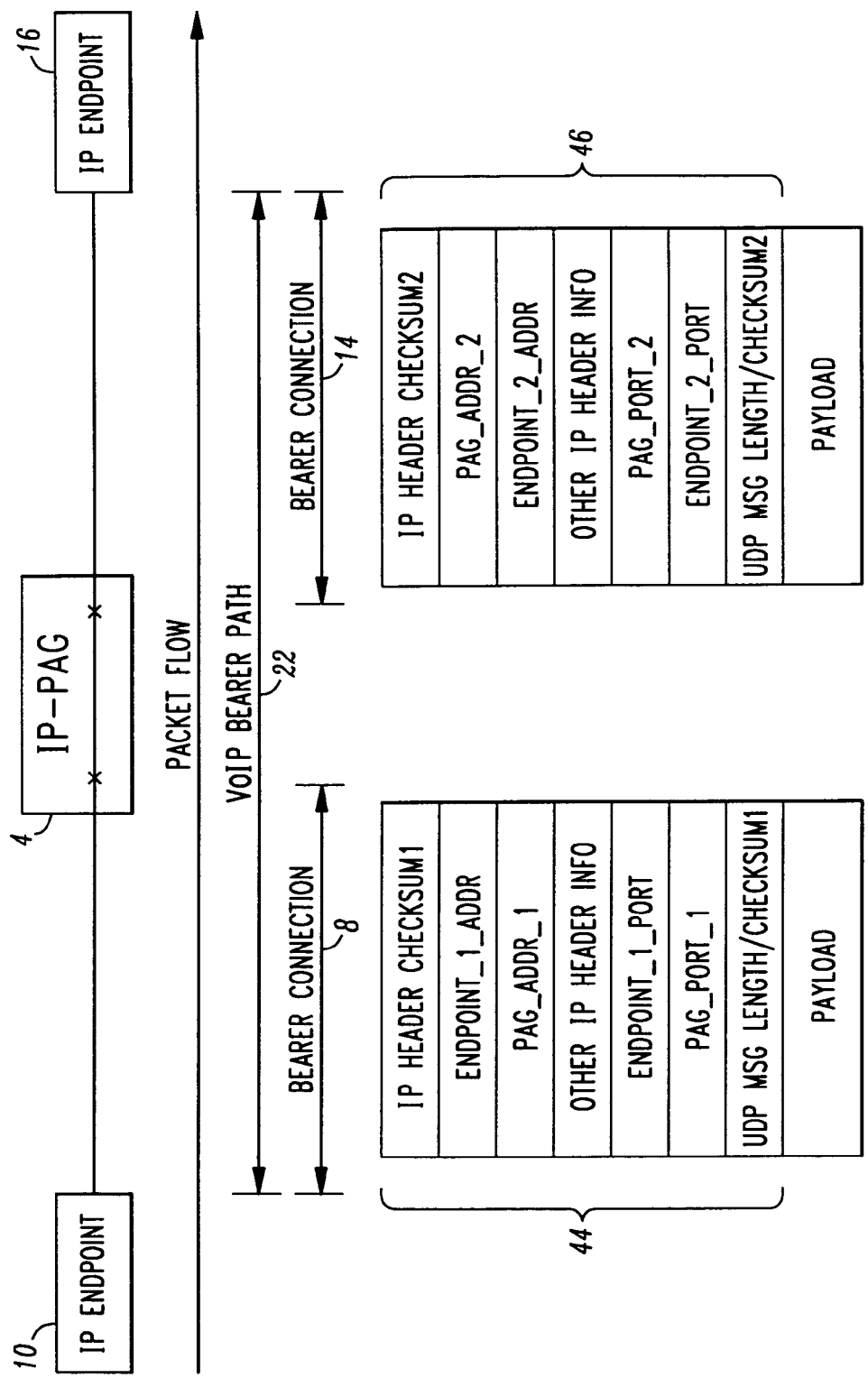
FIG. 3 is a block diagram showing an IP PAG and the modification of IP packets routed through the IP PAG from a first IP endpoint to a second IP endpoint.

Thus, upon locating the first tuple 36 in the bearer connection address table, the bearer traffic packet handler 24 checks the status flag 42 of the entry. If the status flag 42 is inactive, the bearer traffic packet handler 24 continues to search the bearer connection address table for an entry with a matched tuple 36 and an active status flag. If the status flag 42 is active, it then determines from the second tuple 38 the IP address and port number of the second IP endpoint 16. As indicated, the second tuple contains an IP address and port number used by the IP PAG 4 relative to the second bearer connection 14, and an IP address and port number used by the second IP endpoint 16 relative to the second bearer connection 14. The bearer traffic packet handler 24 then rewrites the packet header of the incoming IP packet using information determined from the second tuple 38, and sends the rewritten IP packet to the second IP endpoint 16 over the second bearer connection 14. FIG. 3 illustrates this packet transformation process. A packet header for a packet received at the IP PAG 4 from the IP endpoint 10 is shown at 44. The packet header of the transformed packet sent to the IP endpoint 16 is shown at 46.

The bearer traffic packet handler 24 may also be adapted to perform bearer traffic policing including enforcement of the amount of IP bearer traffic the source is allowed to send for a given IP bearer path. Actions taken as a result of bearer traffic policing may include logging and/or dropping unauthorized packets.

The IP PAG 4 may further includes a signaling traffic IP packet handler 46 (signaling traffic packet handler) for relaying signaling messages from one or both of the IP endpoints 10 and 16 to a destination. As shown in FIG. 4, the signaling packet traffic handler 46 maintains an authorized IP endpoint address table 48 that includes one entry 50 per IP endpoint that is authorized to send signaling messages to the destination. This table can be statically provisioned using a subscriber database, or could be dynamically provisioned if dynamic IP endpoint registration is supported. Each entry 50 includes the IP address 52 of an authorized IP endpoint and a corresponding IP PAG signaling port number 54. As part of signaling message relay, a signaling traffic IP packet is received at the IP PAG 4 from an IP endpoint and the packet header is rewritten. In particular, the source IP address is changed to the IP address of the IP PAG 4 and the source port number is changed to the assigned IP port number found in the IP endpoint address table 48. The destination IP address is then changed to the IP address of the destination, and the destination IP port number is changed to the IP Port number of the destination. The signaling message could be an H.323, (Session Initiation Protocol), H.248, or other signaling message sent to a call control entity, an SNMP (Simple Network Management Protocol) signaling message sent to an SNMP manager (see below), or otherwise.

The signaling traffic packet handler 46 preferably performs signaling traffic policing to verify that an IP endpoint sending signaling messages is authorized to send such messages. The signaling traffic policing function includes performing a table lookup in the authorized IP endpoint address table 48 relative to a signaling traffic IP packet received at the IP PAG 4. The purpose of this lookup is to verify that the IP address of the IP endpoint is listed in the authorized IP endpoint address table 48 and to find the port number assigned to the IP endpoint. As stated, the port number found in the IP endpoint address table will be used as the source port number in the signaling message to be relayed to its final destination. As an additional feature, the IP PAG 4 could, based on a request from the call control entity 18, throttle signaling messages destined to the call control entity. This throttling could be of all signaling messages or could be selective based on IP endpoint.

The IP PAG 4 can be implemented as a programmed computer platform equipped with (at least) two network ports (e.g., Ethernet ports) that provide the bearer connection terminations 6 and 12, and a signaling port terminating the communication link 19 to the call control entity 18. The IP PAG4 can (and normally will) have a different IP address for the two network ports. The selected computer platform will provide a programmable execution environment for implementing the bearer traffic packet handler 24 and the signaling traffic packet handler 46 as software processes. A random access memory space (not shown) will be provided to maintain the tables 26 and 48.

The call control entity 18 communicates with the IP PAG 4 using a media gateway control protocol such as an IPDC (IP Device Control) or H.248 (also known as the Media Gateway Control (Megaco) Protocol). Both of these protocols are well known in the art, but extensions will be required to support the IP-PAG functions described herein. The call control entity 18 may be implemented on a separate computer platform from the IP PAG 4, or on the same platform.

Figure 5:
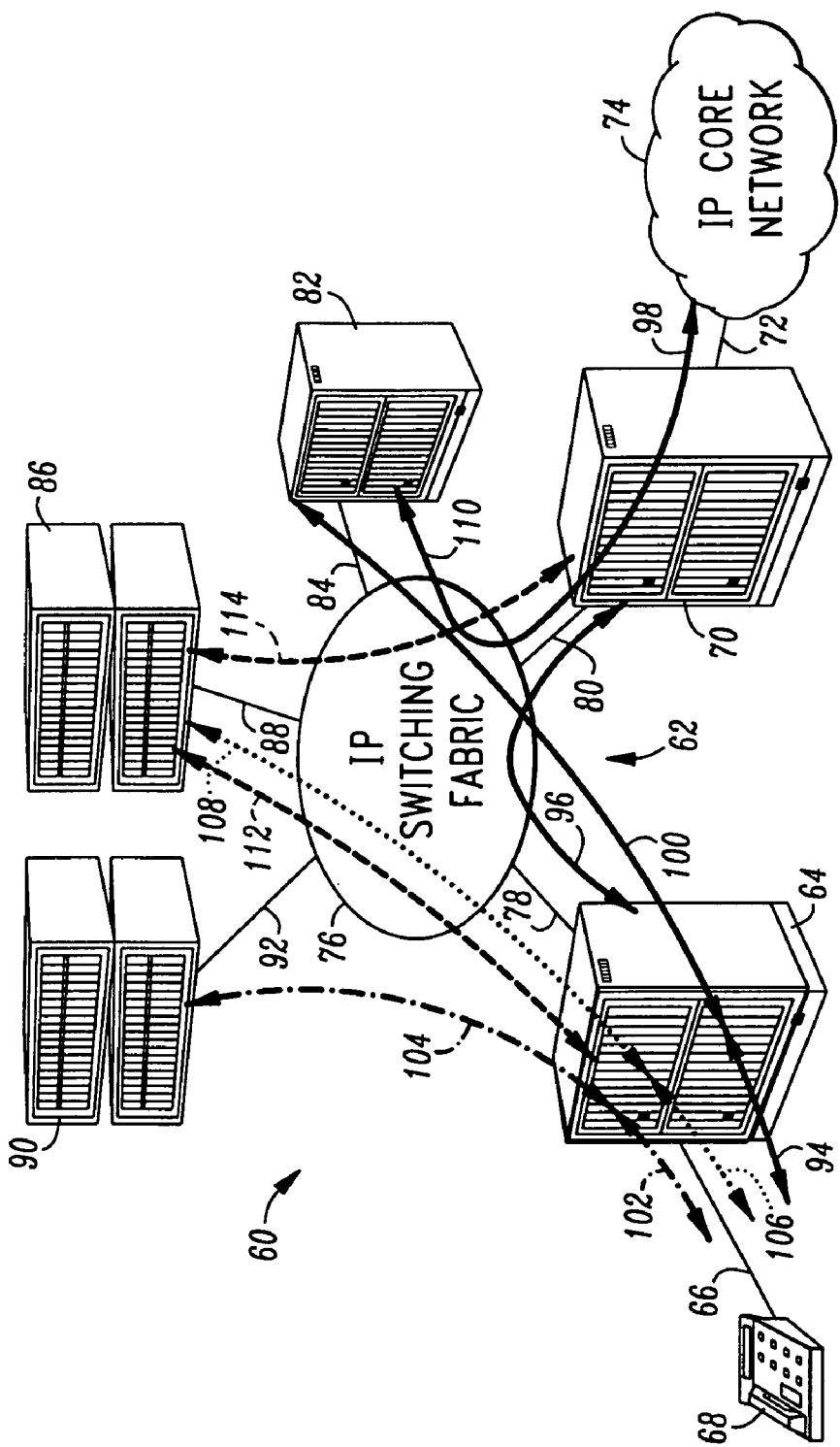
FIG. 5 is a block diagram showing another IP PAG system associated with a network switching node.

Turning now to FIG. 5, an embodiment of the invention is shown for use in association with a network switching node 60. In this embodiment, an IP PAG system 62 includes a line-side IP PAG 64 terminating an IP line 66 to an IP telephone 68. The IP PAG system 62 further includes a trunk-side IP PAG 70 terminating a BICC (Bearer Independent Call Control) supported IP packet trunk 72 that connects to an IP core network 74. An IP switching fabric 76 is disposed between the line-side IP PAG 64 and the trunk-side IP PAG 70. The line-side IP PAG 64 connects to the IP switching fabric 76 through a communication pathway 78. The trunk-side IP PAG 70 connects to the IP switching fabric 76 through a communication pathway 80. The switching node 60 further includes one or more resource servers, interworking gateways, interworking units, or data termination systems. These communication support entities are collectively referenced at 82 in FIG. 5. A communication pathway 84 connects the communication support entities 82 to the IP switching fabric 76.

The cell control entity of the IP PAG system 62 is referenced at 86 in FIG. 5. It communicates with the IP PAGs 64 and 70 using the IPDC or H.248 protocol. A communication pathway 88 connects the call control entity 86 to the IP switching fabric 76. An SNMP manager 90 is also provided. It connects to the IP switching fabric 76 through a communication pathway 92.

The line-side IP PAG 64 supports line-side traffic from the IP telephone 68 and, together with the call control entity 86, performs the IP PAG functions described above relative to FIGS. 1–4. These functions include per call control of bearer paths between the IP telephone 68 and remote or local IP endpoints, bearer traffic policing, signaling message relay, and signaling traffic policing. Note that bearer traffic may be carried on a bearer path that connects the IP telephone 68, the IP switching fabric 76, the trunk-sided IP PAG 70 and a remote IP endpoint (not shown) communicating with the IP core network 74. This bearer path includes the connections labeled 94, 96 and 98 in FIG. 5. Alternatively, bearer traffic may be carried on a bearer path that connects the IP telephone 68, the switching fabric 76 and one of the communication support entities 82, such as a resource server that provides tones and announcements to the IP telephone 68, and/or detects tones or recognizes speech generated from the IP telephone 68. This bearer path includes the connections labeled 94 and 100 in FIG. 5.

The above-described bearer paths illustrate that the line-side IP PAG 64 can act as a bearer traffic pivot point that supports call redirection and the insertion/removal of service circuits in established connections. Features such as conferencing, call transfer, call waiting, multiple call appearances, shared DN (Dialed Number), and call pickup can thus be supported. More particularly, the line-side IP PAG 68 can be used to support functions such as (1) bearer-hold-and-alternate, (2) bearer-move, (3) bearer bridging, (4) dial tone, (5) stutter dial tone, (6) reorder tone, (7) call waiting tone, (8) digit collection/flash detection, (9) audible ringing toward the IP telephone 68 for incoming calls, and (10) comfort noise toward the IP telephone 68 when a bearer path is placed on hold. Wiretapping support is also provided due to the ability keep bearer connections routed through the fixed location of the line-side IP PAG 64.

Signaling traffic relayed by the line-side IP PAG 64 may include SNMP messages, H.323 messages, SIP messages, H.248 messages etc., depending on the signaling protocol(s) supported by the IP telephone 68. Message relay can also be used for IP telephone provisioning, including dynamically updating the authorized IP endpoint table 48. Using a port number assignment scheme, the line-side IP PAG 64 can be configured to relay SNMP messages to the SNMP manager 90, as shown by the connections labeled 102 and 104 in FIG. 5. Similarly, H.323, SIP, or H.248 messages can be relayed to the call control entity 86, as shown by the connections labeled 106 and 108.

The trunk-side IP PAG 70 supports trunk-side traffic from the IP core network 74 and performs the functions of per-call control of bearer paths and bearer traffic policing. The trunk-side IP PAG 70 provides bearer path connections between remote IP endpoints (not shown) communicating over the IP packet trunk 72 and local IP endpoints in the network switching node 60, including the line-side IP PAG 64 and one or more of the communication support entities referenced at 82. In FIG. 5, the bearer path formed by the connections labeled 96 and 98 represents one such example in which the trunk-side IP PAG 70 maintains a connection to the line-side IP PAG 64. The bearer path formed by the connections labeled 98 and 110 represents another example wherein the trunk-side IP PAG 70 maintains a connection to one of the communication support entities 82. Like the line-side IP PAG 68, the trunk-side IP PAG 70 also provides bearer pivot points and can be used to perform such functions as generating tones toward the IP core network 74 for incoming calls, generating comfort noise toward the IP core network when a bearer path is placed on hold, and collecting digits carried over the bearer path.

The call control entity 86 controls the handling of bearer traffic routed through the IP PAGs 64 and 70 in the manner described above relative to FIGS. 1–3. The connection labeled 112 in FIG. 5 carries IDPC or H.248 messages from the call control entity 86 to the line-side IP PAG 68. The connection labeled 114 in FIG. 5 carries IDPC or H.248 messages from the call control entity 86 to the trunk-side IP PAG 70.

Figure 6:
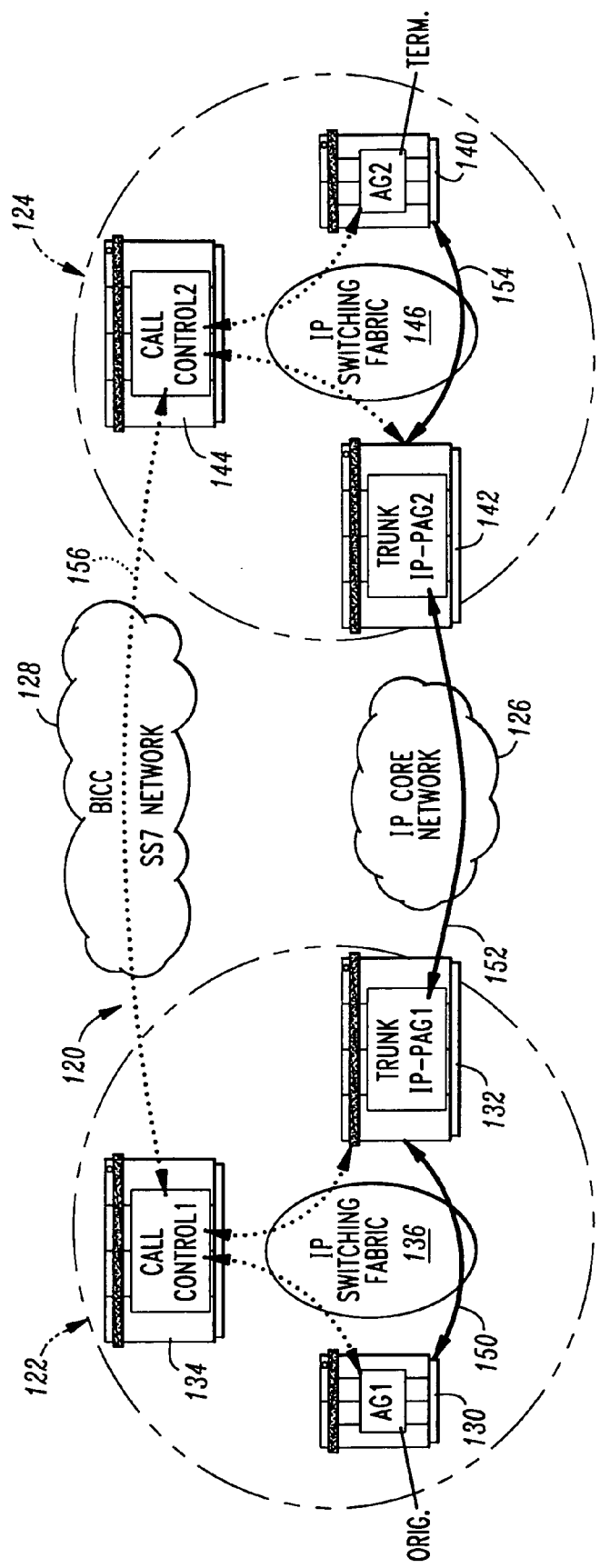
FIG. 6 is a block diagram showing a VoIP network incorporating IP PAGs in accordance with the invention.
Figure 7:
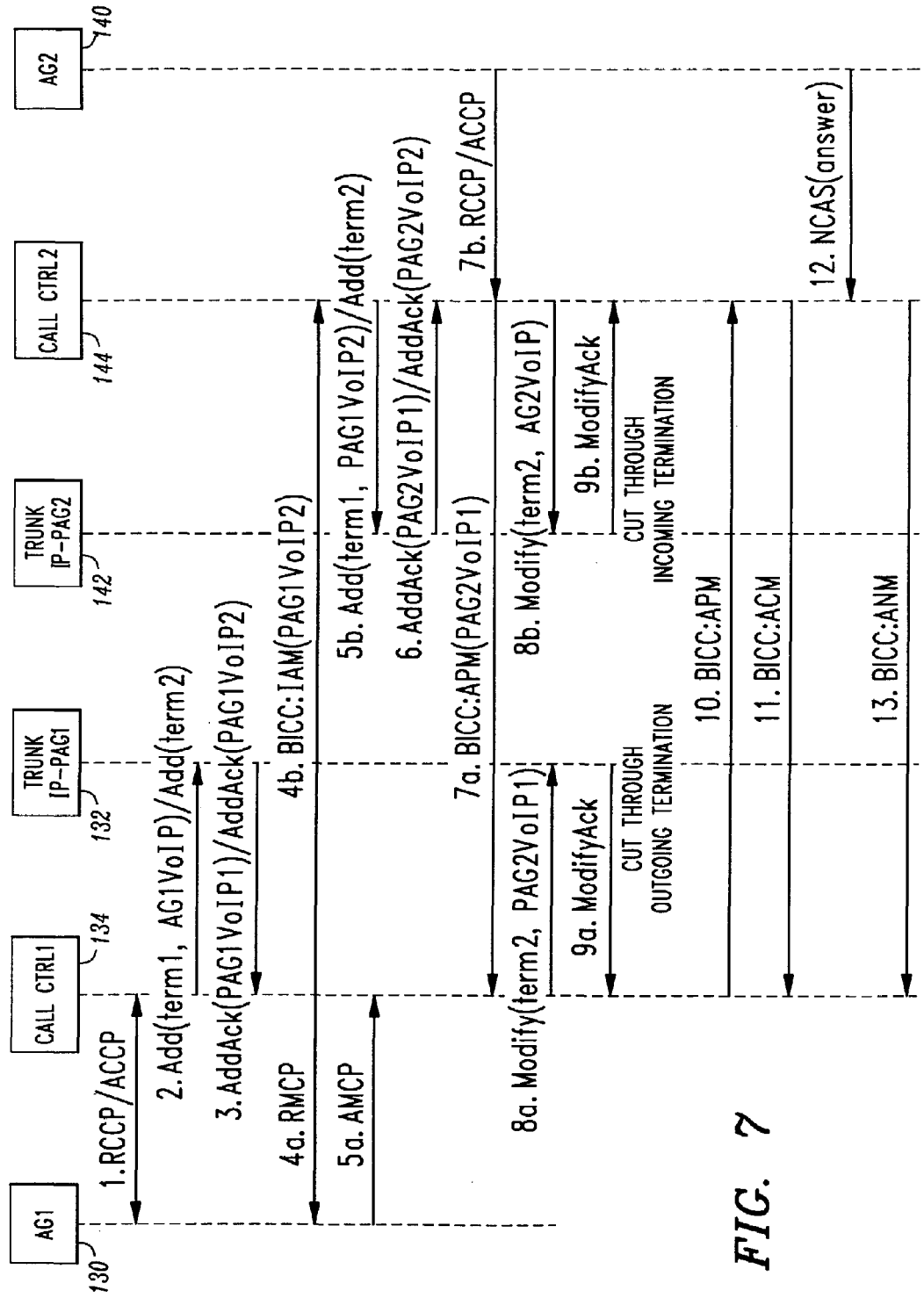
FIG. 7 is a flow diagram showing an exemplary call setup performed in the IP PAG system of FIG. 6.

Turning now to FIGS. 6 and 7, an exemplary call set-up procedure will be described for a BICC call involving IP PAGs. In FIG. 6, a VoIP communication system 120 includes a call originating IP switching node 122 and a call terminating IP switching node 124. An intervening IP core network 126 carries bearer traffic between the IP switching nodes 122 and 124. An SS7 signal network 128 carries BICC messages between the IP switching nodes 122 and 124.

The originating IP switching node 122 includes an originating Access Gateway (AG1) 130 that provides a user-to-network interface for an originating IP endpoint (not shown), which is assumed to originate a VoIP call. The gateway 130 can be implemented as a LAG, a TAG, or a line-side IP PAG as described above relative to FIG. 5. The originating IP switching node 122 further includes an originating trunk-side IP PAG 132, an originating call control entity 134 and an IP switching fabric 136. The terminating IP switching node 124 includes a terminating Access Gateway (AG2) 140 that provides a user-to-network interface for a terminating IP endpoint (not shown) that is assumed to terminate the VoIP call from the originating IP endpoint. Like the originating gateway 130, the terminating gateway 140 can be implemented as a LAG, a TAG, or a line-side IP PAG as described above relative to FIG. 5. The terminating IP switching node 124 further includes a terminating trunk-side IP PAG 142, a call control entity 144 and an IP switching fabric 146. A bearer path between the originating gateway 130 and the terminating gateway 140 is formed by three bearer connections respectively labeled 150, 152 and 154. A signaling connection 156 extends between the call control entities 134 and 144.

It is assumed for purposes of the present example that the call control entities 134 and 144 are adapted to communicate connection control messages to IP PAGs under their dominion using the H.248 protocol. As is known, the H.248 protocol enables media gateways to establish connection terminations and to group such terminations within "contexts" that allow the routing of bearer traffic between the connections that are represented therein.

FIG. 7 shows the message flow during call setup in the VoIP communication system 120. The messages include IPDC signaling messages respectively exchanged between the gateways 130 and 140 and the call control entities 134 and 144, BICC signaling messages exchanged between the call control entities 134 and 144, and H.248 control messages exchanged between the call control entities 134 and 144 and their respective IP PAGs 132 and 142.

In step 1, the originating gateway 130 sends an IPDC connection request message (RCCP) to the originating call control entity 134, and the originating call control entity returns an IPDC message (ACCP) acknowledging receipt of the RCCP request. Note that the connection request message will include a port number (AGI VoIP) that the originating gateway 130 intends to use for the connection. In step 2, the originating call control entity 134 sends an H.248 message (Add(term1, AG1VoIP)/Add(term2)) to the originating trunk-side IP PAG 132. This message requests the originating trunk-side IP PAG 132 to add a pair of connection terminations, one (term1) for a connection to the originating gateway 130 (at its port number AGI VoIP) and the other (term2) for a connection to the terminating trunk-side IP-PAG 142. In step 3, the originating trunk-side IP PAG 132 sends an H.248 reply message (AddAck(PAG1VoIP1)/AddAck(PAg1 VoIP2)) back to the originating call control entity 134 acknowledging that it has established the two requested first and second terminations and advising that they will be respectively handled by its port numbers PAG1VoIP1 and PAG1VoIP2.

In step 4a, the originating call control entity 134 sends an IPDC message (RMCP) to the originating gateway 130 advising of the remote RTP port number (PAG1VoIP1) for the bearer connection. In step 4b, the originating call control entity 134 sends a BICC Initial Address Message (BICC:IAM(PAG1VoIP2)) to the terminating call control entity 144 advising that the originating trunk-side IP PAG 132 is ready to terminate a connection with the terminating trunk-side IP PAG 142 at the former's port number PAG1 VoIP2.

In step 5a, the originating gateway 130 returns an IPDC message (AMCP) to the originating call control entity 134 acknowledging receipt of the RMCP message. In step 5b, the terminating call control entity 144 sends an H.248 message (Add(term1, PAG1VoIP2)/Add(term2)) to the terminating trunk-side IP PAG 142 to add a pair of connection terminations, one for a connection to the originating trunk-side IP PAG 132 at its port number PAG1VoIP2 and the other for a connection to the terminating gateway 140. In step 6, the terminating trunk-side IP PAG 142 sends an H.248 reply message (AddAck(PAG2VoIP1)/AddAck(PAG2VoIP2)) back to the terminating call control entity 144 acknowledging that it has established the two requested terminations and advising that the first termination will be handled by its port number PAG2VoIP1 and the second termination will be handled by its port number PAG2VoIP2.

In step 7a, the terminating call control entity 144 sends a BICC message (BICC:APM(PAG2VoIP1) to the originating call control entity 134 advising that the terminating trunk-side IP PAG 142 is ready to terminate a connection to the originating trunk-side IP PAG 132 at the former's port number PAG2VoIP1. In step 7b, the terminating call control entity 144 sends an IPDC connection request message (RCCP) to the terminating gateway 140 specifying the RTP port number (PAG2VoIP2) the terminating trunk-side IP PAG allocates for the connection, and the terminating gateway returns an acknowledgement message (ACCP). Note that this acknowledgement message will contain a port number (AG2VoIP) that the terminating gateway 140 intends to use for the connection.

In step 8a, the originating call control entity 134 sends an H.248 message (Modify(term2,PAG2VoIP1)) to the originating trunk-side IP PAG 132 requesting that it set the remote RTP port number for its second termination to port number PAG2VoIP1 returned by the terminating trunk-side IP PAG2 in step 6. In step 8b, the terminating call control entity 144 sends an H.248 message (Modify(term2, AG2VoIP)) to the terminating trunk-side IP PAG 142 requesting that it set the remote RTP port number for its second termination to port number AG2VoIP returned by the terminating gateway 140 in step 7b. In step 9a, originating trunk-side IP PAG 132 sends an H.248 reply message (ModifyAck) to the originating call control entity 134 acknowledging that it has updated its second termination, and then cuts through the connection between the two terminations. In step 9b, the terminating trunk-side IP PAG 142 sends a similar message (ModifyAck) to the terminating call control entity 144, and then cuts through the connection.

In step 10, the originating call control entity 134 sends a BICC message (BICC:APM) to the terminating call control entity 144 to acknowledge receipt of the BICC:AMP message sent in step 7a. In step 11, the terminating call control entity sends a BICC message (BICC:ACM) to the originating call control entity. In step 12, an IPDC notify message (NCAS) is sent from the terminating gateway 140 to the terminating call control entity 144 to inform that the called party has answered the call. In step 13, the terminating call control entity sends a BICC message (BICC:ANM) to the originating call control entity 134. At this point the bearer path is established and ready for bearer traffic.

Accordingly, an IP Packet Access Gateway (IP PAG) system has been disclosed for managing a VoIP bearer path between IP endpoints. Advantageously, by serving as a point of connection mediation, the disclosed IP PAG system provides per-call control of IP bearer paths independently of the actions of the communicating endpoints. Bearer traffic policing is also provided, thereby implementing a form of firewall protection that can be enforced dynamically on a per-call basis. When implemented in a VoIP communication network, the IP PAG system of the invention provides feature independence by allowing each switching node to implement calling features independently of features being implemented at other switching nodes. Without the IP PAG system, activation of call feature requests from IP endpoints would require cooperation between the switching nodes involved in a call. Because each switching node operations independently of the other, there would be a possibility of simultaneous and conflicting feature requests being implemented. The IP PAG system of the invention eliminates the possibility of such conflicts as well as the need for negotiation when activating feature requests. Support for communications assistance for law enforcement is also provided by virtue of the fact that a bearer path can be held within a geographic boundary in which it may be surveilled. By comparison, in VoIP calls handled by traditional routers, there is no such guarantee of geographic control.

While various embodiments of the invention have been described, it should be apparent that many variations and alternative embodiments could be implemented in accordance with the invention. In addition to Voice over IP calls there will be data and video over IP calls and this invention would also apply to these calls. It is understood, therefore, that the invention is not to be in any way limited except in accordance with the spirit of the appended claims and their equivalents.

What is claimed is:

1. An IP Packet Access Gateway (IP PAG) system for managing an IP bearer path between IP endpoints, comprising:
   an IP PAG;
   a first IP bearer connection termination in said IP PAG for terminating a first bearer connection with a first IP endpoint;
   a second IP bearer connection termination in said IP PAG for terminating a second bearer connection with a second IP endpoint;
   a call control entity associated with said IP PAG for communicating call control instructions to said IP PAG, said call control instructions including instructions for logically concatenating said connections into an active IP bearer path extending between said first IP endpoint and said second IP endpoint;
   a bearer traffic IP packet handler in said IP PAG for moving bearer traffic IP packet payloads over said active IP bearer path, said packet payloads being part of a call established between said first IP endpoint and said second IP endpoint and comprising voice, data, multimedia or other information; and
   a bearer connection address table for use by said traffic handler that associates said first IP bearer connection and said second IP bearer connection with said active IP bearer path, said bearer connection address table being constructed to provide bearer path pivot capability that allows said first IP bearer connection to participate in multiple IP bearer paths that respectively associate said first IP bearer connection with alternative second IP bearer connections that can be switched into and out of association with said first bearer connection by modifying said bearer connection address table to select one of said multiple IP bearer paths as said active IP bearer path.

2. A system in accordance with claim 1 wherein said bearer connection address table associates said active IP bearer path with said first bearer connection and said second bearer connection in accordance with said concatenating instructions.

3. A system in accordance with claim 2 wherein said bearer connection address table includes a key entry corresponding to said active IP bearer path (IP bearer path entry), and comprising first and second tuples respectively corresponding to said first bearer connection and said second bearer connection.

4. A system in accordance with claim 3 wherein said first tuple includes a first IP address and a port number for said IP PAG and an IP address and a port number for said first IP endpoint, and said second tuple includes a second IP address and a port number for said IP PAG and an IP address and a port number for said second IP endpoint.

5. A system in accordance with claim 4 wherein said bearer traffic IP packet handler is adapted to move bearer traffic IP packet payloads from said first IP endpoint to said second IP endpoint by:
   receiving a bearer traffic IP packet from said first IP endpoint over said first bearer connection;
   searching for an IP bearer path entry in said bearer connection address table having an associated first tuple that contains the packet header source IP address and source port number of said received IP packet;
   upon locating said IP bearer path entry in said bearer connection address table determining from the second tuple associated with said entry the IP address and port number of said second IP endpoint;
   rewriting the packet header of said bearer traffic IP packet using the IP address and port number of said IP PAG as the source IP address and source port number, and using the IP address and port number of said second IP endpoint as the destination IP address and destination port number; and
   sending said rewritten bearer traffic IP packet to said second IP endpoint over said second bearer connection.

6. A system in accordance with claim 5 wherein said bearer traffic IP packet handler is adapted to perform bearer traffic policing to verify that said received bearer traffic IP packet is associated with an active IP bearer path and is authorized for transmission on that path.

7. A system in accordance with claim 6 wherein each IP bearer path entry in said bearer connection address table includes a status flag indicative of an associated IP bearer path being active or inactive, and wherein said bearer traffic policing includes checking said status flag for active status.

8. A system in accordance with claim 7 wherein said bearer traffic policing includes logging and/or dropping unauthorized packets.

9. A system in accordance with claim 7 wherein said bearer connection address table contains multiple IP bearer path entries having associated tuples identifying said first IP endpoint, and wherein said IP PAG is controllable by said call control entity to act as a IP bearer path pivot point by selectively activating the status flags associated with said IP bearer path entries.

10. A system in accordance with claim 1 further including a signaling traffic IP packet handler for relaying signaling messages from one or both of said IP endpoints to a destination.

11. A system in accordance with claim 10 wherein said signaling traffic IP packet handler maintains an IP endpoint address table that lists IP addresses for IP endpoints that are authorized to send signaling messages to said destination, and which lists IP port numbers, one for each of authorized IP endpoint.

12. A system in accordance with claim 11 wherein said signaling message relay includes receiving a signaling traffic IP packet from said first or second IP endpoint and rewriting the packet header of said signaling packet by:
   setting the source IP address to the IP address of said IP PAG;
   setting the source port number to an IP port of said IP PAG as determined from said IP endpoint address table;
   setting the destination IP address to an IP address of said destination as determined by the source IP address and the destination port number of the signaling message received; and
   leaving the destination IP port unchanged.

13. A system in accordance with claim 12 wherein said signaling message is an H.323, SIP, or H.248 signaling message and said destination is a call control entity.

14. A system in accordance with claim 12 wherein said signaling message is an SNMP signaling message and said destination is an SNMP manager.

15. A system in accordance with claim 12 wherein said signaling traffic IP packet handler is adapted to perform signaling traffic policing to verify that said IP endpoint sending said signaling messages is authorized to send such messages.

16. A system in accordance with claim 15 wherein said signaling traffic policing includes performing a table lookup in said IP endpoint address table relative to an IP signaling packet received from said first IP endpoint to verify that said IP endpoint is listed in said table and to obtain a port number assigned to said IP endpoint from said table.

17. A system in accordance with claim 15 wherein said call control entity is adapted to dynamically throttle signaling messages sent to said destination.

18. A system in accordance with claim 1 wherein said system includes a line-side IP PAG terminating plural IP lines and a trunk-side IP PAG terminating plural IP trunks.

19. A system in accordance with claim 18 and further including an IP switching fabric between said line-side IP PAG and said trunk-side IP PAG.

20. A system in accordance with claim 19 and further including one or more resource servers, interworking gateways, interworking units, or data termination systems.

21. A method for managing an IP bearer path between IP endpoints, comprising the steps of:
    terminating a first IP bearer connection with a first IP endpoint;
    terminating a second IP bearer connection with a second IP endpoint;
    logically concatenating said connections into an active IP bearer path extending between said first IP endpoint and said second IP endpoint;
    moving bearer traffic IP packet payloads over said active IP bearer path, said packet payloads being part of a call established between said first IP endpoint and said second IP endpoint and comprising voice, data, multimedia or other information; and
    said moving step utilizing a bearer connection address table that associates said first IP bearer connection and said second IP bearer connection with said active IP bearer path, said bearer connection address table being constructed to provide bearer path pivot capability that allows said first IP bearer connection to participate in multiple IP bearer paths that respectively associate said first IP bearer connection with alternative second IP bearer connections that can be switched into and out of association with said first bearer connection by modifying said bearer connection address table to select one of said multiple IP bearer paths as said active IP bearer path.

22. A method in accordance with claim 21 wherein said concatenating step comprises establishing a key entry in said bearer connection address table.

23. A method in accordance with claim 22 wherein said key entry corresponds to said active IP bearer path (IP bearer path entry) and comprises first and second tuples respectively corresponding to said first bearer connection and said second bearer connection.

24. A method in accordance with claim 23 wherein said first tuple includes a first IP address and a port number for said IP PAG and an IP address and a port number for said first IP endpoint, and said second tuple includes a second IP address and a port number for said IP PAG and an IP address and a port number for said second IP endpoint.

25. A method in accordance with claim 24 wherein moving step includes moving bearer traffic IP packet payloads from said first IP endpoint to said second IP endpoint by:
    receiving a bearer traffic IP packet from said first IP endpoint over said first bearer connection;
    searching for an IP bearer path entry in said bearer connection address table having an associated first tuple that contains the packet header source IP address and source port number of said received IP packet;
    upon locating said IP bearer path entry in said bearer connection address table determining from the second tuple associated with said entry the IP address and port number of said second IP endpoint;
    rewriting the packet header of said bearer traffic IP packet using the IP address and a port number associated with said active bearer path as the source IP address and source port number, and using the IP address and port number of said second IP endpoint as the destination IP address and destination port number; and
    sending said rewritten bearer traffic IP packet to said second IP endpoint over said second bearer connection.

26. A method in accordance with claim 25 further including performing bearer traffic policing to verify that said received bearer traffic IP Packet is associated with an active IP bearer path and is authorized for transmission on that path.

27. A method in accordance with claim 26 wherein each VoIP bearer path entry in said bearer connection address table includes a status flag indicative of an associated IP bearer path being active or inactive, and wherein said bearer traffic policing step includes checking said status flag for active status.

28. A method in accordance with claim 27 wherein said bearer traffic policing includes logging and/or dropping unauthorized packets.

29. A method in accordance with claim 27 wherein said bearer connection address table contains multiple IP bearer path entries having associated tuples identifying said first IP endpoint, and wherein a bearer path pivot point is implemented by selectively activating the status flags associated with said IP bearer path entries.

30. A method in accordance with claim 21 further including relaying signaling messages from one or both of said IP endpoints to a destination.

31. A method in accordance with claim 30 wherein said signaling message relaying step includes maintaining an IP endpoint address table that lists IP addresses for IP endpoints that are authorized to send signaling messages to said destination, and which lists IP PAG port numbers, one for each authorized IP endpoint.

32. A method in accordance with clam 31 wherein said signaling message relay step includes a signaling traffic IP packet from said first IP endpoint and rewriting the packet header of said signaling packet by:
    setting the source IP address to IP address of said IP PAG relaying said signaling messages;
    setting the source port number to said IP port assigned to said first IP endpoint, as determined from said IP endpoint address table;
    setting the destination IP address to an IP address of said destination, as determined by said source IP address and the destination port number of said signaling message received; and
    leaving the destination port unchanged.

33. A method in accordance with claim 32 wherein said signal message is an H.323, SIP, H.248, or other call signaling message and said destination is a call control entity.

34. A method in accordance with claim 32 wherein said signaling message is an SNMP signaling message and said destination is an SNMP manager.

35. A method in accordance with claim 32 wherein said signaling message relay step performs signaling traffic policing to verify that said IP endpoint sending said signaling messages is authorized to send such messages.

36. A method in accordance with claim 35 wherein said signaling traffic policing includes performing a table lookup in said IP endpoint address table relative to an IP signaling packet received from said first IP endpoint to verify that said IP endpoint is listed in said table and to obtain a port number assigned to said first IP endpoint from said table.

37. A method in accordance with claim 35 further including dynamically throttling signaling messages received at said IP PAG.

38. A method in accordance with claim 21 including terminating plural IP lines at a set of line-side terminating points terminating plural IP trunks at a set of trunk-side terminating points.

39. A method in accordance with claim 38 further including performing switching between said line-side and trunk-side terminating points.

40. A method in accordance with claim 39 further including connecting one of more of said line-side trunk side terminating points to one or more resource servers, interworking gateways, interworking units, or data termination systems.

41. A computer program product for manager product for managing an IP bearer path between IP endpoints, comprising
   one or more data storage media;
   program means recorded on said one or more data storage media for:
   terminating a first IP bearer connection with a first IP endpoint;
   terminating a second IP bearer connection with a second IP endpoint;
   logically concatenating said first and second bearer connections into an active IP bearer path extending between said first IP endpoint and said second IP endpoint;
   moving bearer traffic IP packet payloads over said active IP bearer path, said packet payloads being part of a call established between said first IP endpoint and said second IP endpoint and comprising voice, data, multimedia or other information; and
   said moving step utilizing a bearer connection address table that associates said first IP bearer connection and said second IP bearer connection with said active IP bearer path, said bearer connection address table being constructed to provide bearer path pivot capability that allows said first IP bearer connection to participate in multiple IP bearer paths that respectively associate said first IP bearer connection with alternative second IP bearer connections that can be switched into and out of association with said first bearer connection by modifying said bearer connection address table to select one of said multiple IP bearer paths as said active IP bearer path.

42. A program product in accordance with claim 41 wherein said concatenating program means comprises program means for establishing a key entry in said bearer connection address table.

43. A program product in accordance with claim 42 wherein said key entry corresponds to said active IP bearer path (IP bearer path entry) and comprises first and second tuples respectively corresponding to said first bearer connection and said second bearer connection.

44. A program product in accordance with claim 43 wherein said first tuple includes a first IP address and a port number associated with said IP PAG and an IP address and a port number for said first IP endpoint, and said second tuple includes a second IP address and a port number associated with said IP PAG and an IP address and a port number for said second IP endpoint.

45. A program product in accordance with claim 44 wherein said moving program means includes program means for moving bearer traffic IP packet payloads from said first IP endpoint to said second IP endpoint by:
   receiving a bearer traffic IP packet from said first IP endpoint over said first bearer connection;
   searching for an IP bearer path entry in said bearer connection address table having an associated first tuple that contains the packet header source IP address and source port number of said received IP packet;
   upon locating said IP bearer path entry in said bearer connection address table determining from the second tuple associated with said entry the IP address and port number of said second IP endpoint;
   rewriting the packet header of said bearer traffic IP packet using an IP address and a port number associated with said active bearer path as the source IP address and source port number, and using the IP address and port number of said second IP endpoint as the destination IP address and destination port number; and
   sending said rewritten bearer traffic IP packet to said second IP endpoint over said second bearer connection.

46. A program product in accordance with claim 45 further including program means for performing bearer traffic policing to verify that said received bearer traffic IP packet is associated with an active IP bearer path and is authorized for transmission on that path.

47. A program product in accordance with claim 46 wherein each IP bearer path entry in said address connection table includes a status flag indicative of an associated IP bearer path being active or inactive, and wherein said bearer traffic policing step includes checking said status flag for active status.

48. A program product in accordance with claim 47 wherein said bearer traffic policing program means includes program means for logging and/or dropping unauthorized packets.

49. A program product in accordance with claim 47 wherein said bearer connection address table contains multiple IP bearer path entries having associated tuples identifying said first IP endpoint, and further including program means for implementing a bearer path pivot point by selectively activating the status flags associated with said IP bearer path entries.

50. A program product in accordance with claim 41 further including program means for relaying signaling messages from one of said IP endpoints to a destination.

51. A program product in accordance with claim 50 wherein said signaling message relaying program means includes program means for maintaining an IP endpoint address table that lists IP addresses for IP endpoints that are authorized to send signaling messages to said destination, and which lists IP PAG port numbers, one for each said IP endpoint.

52. A program product in accordance with claim 51 wherein said signaling message relay program means includes program means for receiving a signaling traffic IP packet from said first or second IP endpoint and rewriting the packet header of said signaling packet by:
   setting the source IP address to said IP address associated with said IP PAG relaying said signaling messages;
   setting the source port number to said port number assigned to said IP endpoint, as determined from said IP endpoint address table;

setting the destination IP address to an IP address of said
destination, as determined by the source IP address and
destination port number of signaling message received;
and leaving the destination port unchanged.

53. A program product in accordance with claim 52 wherein said signaling message is an H.323, SIP, or H.248 signaling message and said destination is a call control entity.

54. A program product in accordance with claim 52 wherein said signaling message is an SNMP signaling message and said destination is an SNMP manager.

55. A program product in accordance with claim 52 wherein said signaling message relay program means includes program means for performing signaling traffic policing to verify that said IP endpoint sending said signaling means is authorized to send such messages.

56. A program product in accordance with claim 55 wherein said signaling traffic policing program means includes program means for performing a table lookup in said IP endpoint address table relative to an IP signaling packet received from said first IP endpoint to verify that said IP endpoint is listed in said table and to obtain a port number assigned to said IP endpoint from said table.

57. A program product in accordance with claim 55 further including program means for dynamically throttling signaling messages sent to said destination.

58. A program product in accordance with claim 41 including program means for terminating plural IP lines at a set of line-side terminating points and terminating plural IP trunks at as et of trunk-side terminating points.

59. A program product in accordance with claim 58 further including program means for performing switching between said line-side and trunk-side terminating points.

60. A program product in accordance with claim 59 further including program means for connecting one of more of said line-side or trunk side terminating points to one or more resource servers, interworking gateways, interworking units, or data termination systems.

* * * * *